(12) United States Patent
Rossi et al.

(10) Patent No.: US 7,675,923 B2
(45) Date of Patent: *Mar. 9, 2010

(54) HOME NETWORK BRIDGE-BASED COMMUNICATIONS METHOD AND APPARATUS

(75) Inventors: Steven K. Rossi, Schaumburg, IL (US); Jay R. Almaula, Bartlett, IL (US); Pekin E. Eren, Arlington Heights, IL (US); Daniel F. Stewart, Hoffman Estates, IL (US); Joseph F. Wodka, Hoffman Estates, IL (US)

(73) Assignee: General Instrument Corporation, Horsham, PA (US)

( * ) Notice: Subject to any disclaimer, the term of this patent is extended or adjusted under 35 U.S.C. 154(b) by 1077 days.

This patent is subject to a terminal disclaimer.

(21) Appl. No.: 10/997,482

(22) Filed: Nov. 24, 2004

(65) Prior Publication Data
US 2006/0120386 A1    Jun. 8, 2006

(51) Int. Cl.
*H04L 12/56* (2006.01)
(52) U.S. Cl. .................................. 370/401; 370/409
(58) Field of Classification Search ............ 370/229, 370/230, 230.1, 231, 235, 351, 352, 356, 370/389, 393, 395.1, 397, 399, 395.2, 400, 370/401, 402, 409, 466
See application file for complete search history.

(56) References Cited

U.S. PATENT DOCUMENTS

| | | | |
|---|---|---|---|
| 6,434,156 B1 * | 8/2002 | Yeh | 370/401 |
| 6,523,068 B1 | 2/2003 | Beser et al. | |
| 6,631,416 B2 | 10/2003 | Bendinelli et al. | |
| 6,697,377 B1 | 2/2004 | Ju et al. | |
| 6,701,437 B1 | 3/2004 | Hoke et al. | |
| 6,751,729 B1 | 6/2004 | Giniger et al. | |
| 6,781,982 B1 | 8/2004 | Borella et al. | |
| 6,832,322 B1 * | 12/2004 | Boden et al. | 726/15 |
| 6,947,428 B1 * | 9/2005 | Andersson et al. | 370/395.5 |
| 2002/0138628 A1 * | 9/2002 | Tingley et al. | 709/227 |
| 2003/0048790 A1 * | 3/2003 | McAllister et al. | 370/395.2 |
| 2003/0108041 A1 | 6/2003 | Aysan et al. | |

(Continued)

FOREIGN PATENT DOCUMENTS

EP    1441483 A2    7/2004

OTHER PUBLICATIONS

PCT International Search Report and Written Opinion of the International Searching Authority for PCT/US2005/40033 dated Sep. 7, 2006.

(Continued)

*Primary Examiner*—Ricky Ngo
*Assistant Examiner*—Wei-Po Kao
(74) *Attorney, Agent, or Firm*—Stewart M. Wiener

(57) ABSTRACT

A privately addressed home network bridge is provided for each of two privately addressed home networks. These bridges couple to corresponding gateways for each of the networks. A network tunnel connection is established between the two bridges via the gateways and an intervening publicly addressed network. At least one, and preferably both, of the home network bridges then serve as a proxy/router to facilitate an exchange of messages as between network devices of the two privately addressed home networks. Pursuant to a preferred approach the home network bridges use a mapping technique to correlate private addresses as used in the two privately addressed networks.

21 Claims, 3 Drawing Sheets

U.S. PATENT DOCUMENTS

| | | |
|---|---|---|
| 2004/0148439 A1 | 7/2004 | Harvey et al. |
| 2004/0218611 A1* | 11/2004 | Kim .......................... 370/401 |
| 2005/0088977 A1 | 4/2005 | Roch et al. |
| 2005/0201370 A1* | 9/2005 | Poyhonen et al. ........... 370/389 |
| 2006/0037075 A1* | 2/2006 | Frattura et al. ................ 726/22 |

OTHER PUBLICATIONS

EPC Extended Search Report, RE: Application #05851372.2 - 2416 / 1817882, PCT/US2005040033 Aug. 13, 2009.

* cited by examiner

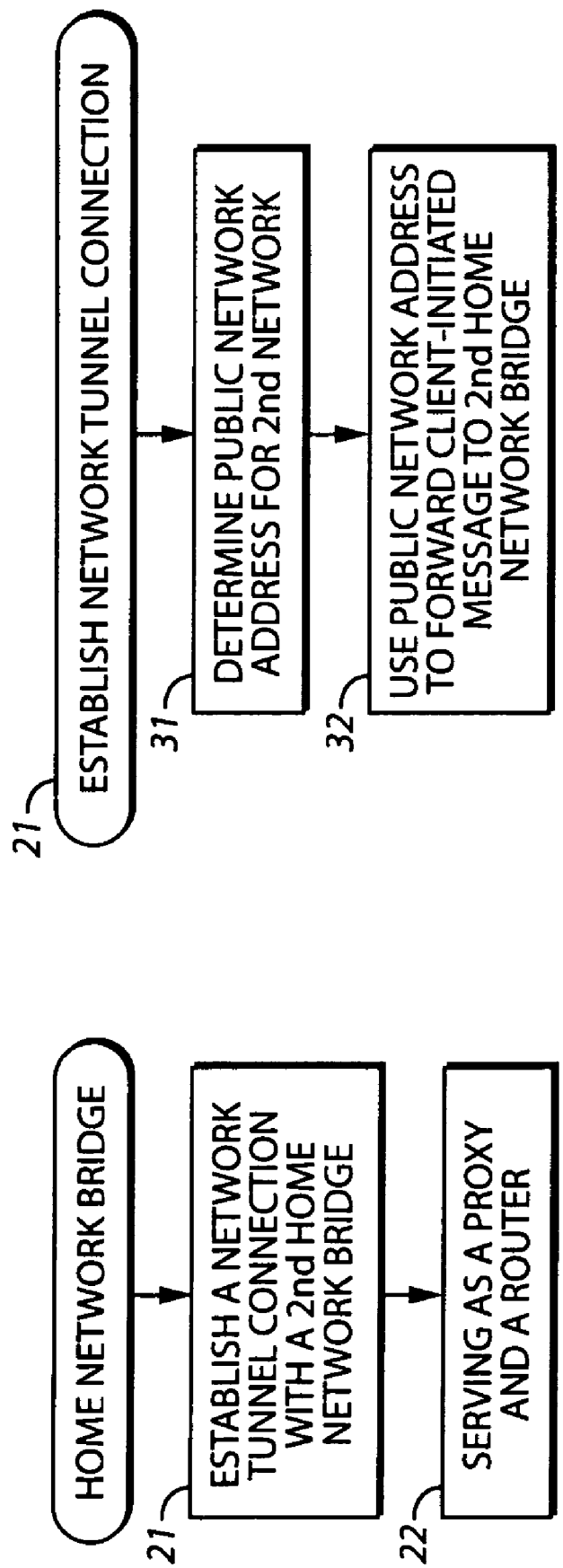

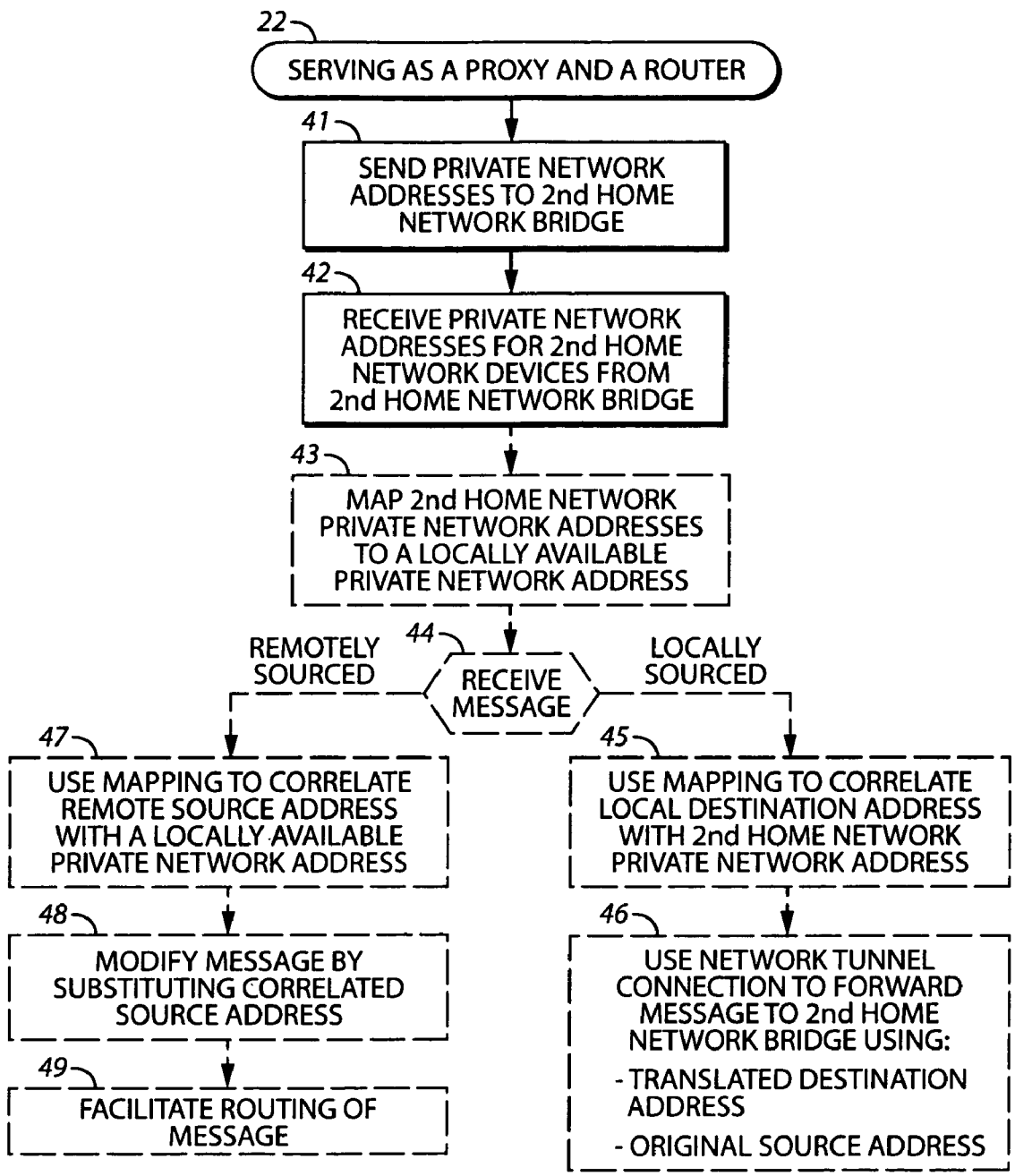

HOME NETWORK BRIDGE-BASED COMMUNICATIONS METHOD AND APPARATUS

RELATED APPLICATIONS

This application relates, in part, to Ser. No. 10/997,444 entitled METHOD AND APPARATUS TO FACILITATE UNIVERSAL PLUG AND PLAY BETWEEN DIFFERENT LOCAL NETWORKS and filed on even date herewith, the contents of which are incorporated herein by this reference.

TECHNICAL FIELD

This invention relates generally to networked communications and more particularly to communications as between two discrete privately addressed networks.

BACKGROUND

Local communication networks of various kinds are known. In more recent times, residential home networks are being installed in increasing numbers. Such home networks, in turn, are facilitating the use of a variety of devices that source and/or utilize various kinds of digital content including such devices as a media receiver. In particular, home networks are proving to be a powerful and convenient way to share various kinds of digital content (such as music, video, and still images) at various locations throughout a given residence.

At present, communications are possible as between two such home networks, but those communications remain relatively limited with respect to supported capabilities. As one simple example, it is relatively difficult to logically connect two home networks in a manner that permits digital content on one home network to be readily and conveniently shared with the elements that comprise the other home network. Easy and convenient content sharing as described earlier continues to remain relatively limited due to the confines of a single home network.

In many cases existing home networks make use of a residential gateway having a dynamic public network address. Such residential gateways typically perform network address translation to map a range of local addresses inside of the gateway (i.e., on the home network side of the gateway) to one single address on the public network side of the gateway. In many cases these local addresses as specified within a given home network will likely overlap the local addresses as are used by one or more (and usually many more) other home networks. This likely overlapping of utilized addresses comprises at least one aspect of why difficulties exist with respect to facilitating convenient and relatively easy sharing as between the devices that comprise a plurality of discrete home networks.

BRIEF DESCRIPTION OF THE DRAWINGS

The above needs are at least partially met through provision of the home network bridge-based communications method and apparatus described in the following detailed description, particularly when studied in conjunction with the drawings, wherein:

FIG. 2 comprises a flow diagram as configured in accordance with various embodiments of the invention;

FIG. 3 comprises a detail flow diagram as configured in accordance with various embodiments of the invention;

FIG. 4 comprises a detail flow diagram as configured in accordance with various embodiments of the invention; and FIG. 5 comprises a view of an illustrative address map as configured in accordance with various embodiments of the invention.

Figure 1:
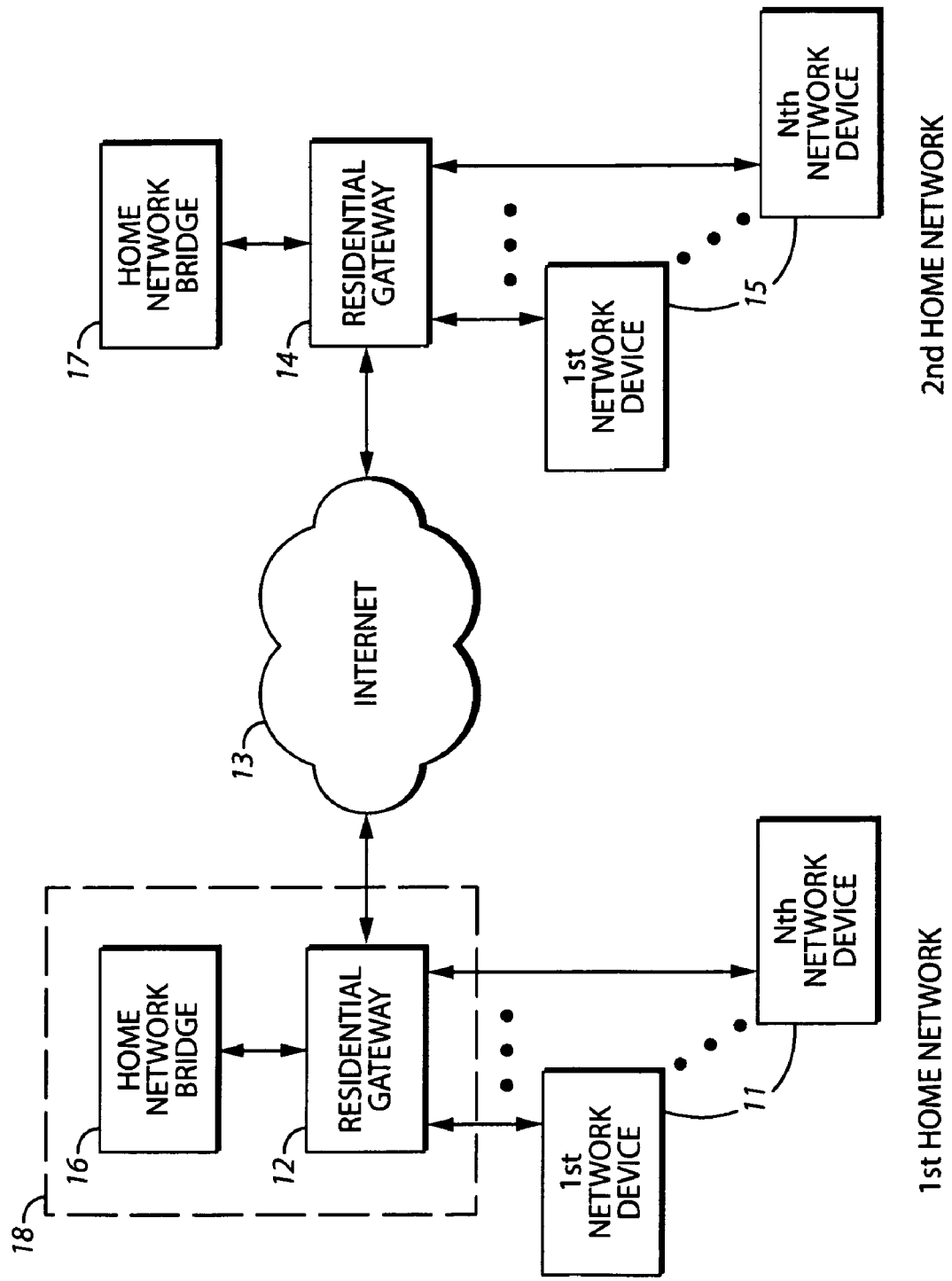
FIG. 1 comprises a block diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, communications are facilitated as between devices of two discrete privately addressed networks, wherein each of the two discrete privately addressed networks are coupled via a publicly addressed network and a corresponding gateway for each of the privately addressed networks. Each of the two discrete privately addressed networks are provided with a privately addressed home network bridge that couples to a respective one of the gateways. In a preferred approach a network tunnel connection is established between these two home network bridges via these gateways and at least one of the home network bridges is caused to serve as a proxy, via the remote privately addressed home network bridge, for devices of the remote discrete privately addressed network and as a router to route communications sourced by the devices of the remote discrete privately addressed network to devices of the local discrete privately addressed network.

In a preferred approach, such a home network bridge maps each of the private network addresses as are assigned within the remote discrete privately addressed network to a locally available private network address within the local discrete privately addressed network. So configured, the home network bridge can translate and/or modify source and/or destination addresses as appropriate to permit both reliable and accurate transport over an intervening public extranet fabric (such as the Internet) and reliable and accurate delivery of a message to a specific device within a remote and discrete privately addressed network. In a preferred approach this occurs in a manner that is substantially transparent to the communicating devices.

So configured, privately addressed devices serviced by discrete privately addressed networks are able to share digital content with one another as though they were a part of a common privately addressed network.

These and other benefits may become clearer upon making a thorough review and study of the following detailed description. Referring now to the drawings, and in particular to FIG. 1, a first privately addressed home network comprises one or more network devices 11 (such as, but not limited to, personal computers of various types, media receivers and players, digital content hubs, and so forth) that couple to a residential gateway 12. This coupling can comprise a wired and/or a wireless link as is well understood in the art. The residential gateway 12 in turn couples to a public extranet such as, in this illustrative example, the Internet 13 via, preferably though not necessarily, a broadband connection of choice. So configured, the network devices 11 can readily communicate amongst themselves and can easily share various kinds of digital content using private addresses as are assigned and/or managed by the residential gateway 12.

In this example, at least a second privately addressed home network also couples to the Internet 13 via its own residential gateway 14 which in turn provides Internet access and private address services to one or more network devices 15 as comprise the user population of this second privately addressed home network.

In this embodiment, each of the home networks further comprises a corresponding home network bridge 16 and 17. Depending upon the architectural choices and options available in a given application, such a home network bridge 16 can comprise a stand-alone platform (as is somewhat suggested by the illustration) or can be integrated 18 with one or more other elements within the privately addressed home network. For example, a residential gateway will typically comprise a partially or wholly programmable platform and hence those skilled in the art will recognize that the home network bridge functionality described herein can be partially or wholly incorporated into such an element.

In these embodiments, and referring now to FIG. 2, these home network bridges serve, in part, to establish 21 a network tunnel connection between themselves such as, but not limited to, a so-called virtual private network connection using, for example, IPSec. When using IPSec, the residential gateway would be instructed to forward UDP port 500 and IP protocol 50 to the home network bridge with the home network bridge running a virtual private network server that listens on the relevant communications channels for connections from a virtual private network client in accordance with well understood prior art technique. Any existing or hereafter-developed tunnel-creation and maintenance approach or mechanism (including both secure and unsecure network tunnel connections) as will meet the needs of this application can be employed for this purpose with a specific selection likely depending upon various system and/or operational requirements or limitations as will be well understood by those skilled in the art. These home network bridges are further configured and arranged to utilize this network tunnel connection to then serve 22 as a proxy for devices of the opposing privately addressed home network to devices of their own respective network while also serving as a router to facilitate routing communications that are sourced by the devices of the opposing privately addressed home network to devices of their own respective network.

As will be described below in more detail, these home network bridges facilitate such client/server behavior, at least in part, by mapping the private network addresses as are assigned within an opposing privately addressed network to locally available private network addresses within their own home privately addressed network. The resultant map is then used to translate and/or modify addresses as are included with source and/or destination address message content.

So configured, these home network bridges will readily facilitate communications and digital content sharing between network devices of differing privately addressed networks in a transparent and dynamic manner such that the network devices all appear to one another as though they are part of a same shared privately addressed network. Various benefits result including avoidance of any need to modify or reprogram the network devices themselves to participate in such activities.

Additional Details are Now Presented.

Referring now to FIG. 3, to establish 21 a network tunnel connection as noted above, a home network bridge can determine 31 a public network address as corresponds to the opposing privately addressed network and use 32 that public network address when forwarding a network tunnel client-initiated message to the opposing privately addressed home network bridge. The method by which a home network bridge determines the dynamic public network address of the opposing private network may utilize an external server that is publicly accessible at a known network address by the home network bridge wherein each home network bridge periodically sends updates of its public network address to the server and utilizes the server to lookup the public network address of other private home networks. So configured, it can be seen that the opposing privately addressed home network bridge is then able to respond to such a network tunnel client-initiated message with a responsive network tunnel server-initiated message, again in general accord with well understood practice.

Referring now to FIG. 4, additional details regarding the proxy and router behavior 22 of the home network bridge will be provided.

Pursuant to a preferred approach, a first home network bridge sends 41 private network addresses as are assigned to devices within its own privately addressed home network to an opposing home network bridge via the previously established network tunnel connection. This permits the opposing home network bridge to use such private network addresses in a mapping activity described below. And, somewhat similarly, this first home network bridge receives 42 private network addresses as are assigned within the opposing privately addressed network for devices of that opposing privately addressed network and as are transmitted to the first home network bridge by the opposing home network bridge. This permits this first home network bridge to also use such private network addresses in the mapping activity described below.

An exchange of such private addresses for devices of discrete and separate privately addressed networks can be subsequently leveraged in various ways to the benefit of one or both such networks. Pursuant to an optional but preferred course of action, the first home network bridge maps 43 each of the private network addresses as are assigned within the opposing privately addressed network to a locally available private network address within its own corresponding privately addressed network. For example, and referring momentarily to FIG. 5, such a map 50 can reflect that some local addresses (such as local address 1 and local address 2) are already assigned for use by local network devices and that at least one such local address (such as local address 3) is used by the local home network bridge itself. In a typical scenario, however, not all available local addresses are already assigned to an existing local network element. In this case, one or more of these otherwise non-assigned but available private addresses can assigned by the home network bridge (or on behalf of the home network bridge by another entity having this task) in correlation to one or more of the private addresses as are used by the opposing network.

For example, as illustrated, local address 4 is now mapped and assigned to remote address 1 as corresponds to a first remote network device while local address X is assigned to remote address Y as corresponds to a Zth remote network device. (Those skilled in the art will recognize that not all such candidate remote network devices are necessarily correlated to a local private address in this way. There may, for example, be an insufficient number of local private addresses to support such an approach. As another example, there may be specific network devices within the opposing network for which such services are to be denied for some previously identified administrative purpose.) It will be understood that inclusion of local address assignment to local network devices and entities reflects an a priori process and state and hence such information may likely not be necessary to include in such a map 50. For example, the residential gateway itself likely contains such information should it be required by the home network bridge.

Referring again to FIG. 4, the home network bridge then uses such map information to effect proxy and/or router services with respect to received messages.

For example, upon receiving 44 a message from one of the network devices as comprises a part of the home privately addressed network, which message comprises, at least in part, a destination address comprising a given one of the locally available private network addresses and a source address comprising a local private address for the device itself, the home network bridge uses 45 the mapping information to correlate the destination address with a particular private network address as is assigned within the destination privately addressed network to a target network device. To illustrate, when the destination address comprises local address 4 as illustrated in FIG. 5 discussed above, the home network bridge uses the map to then identify remote address 1 as corresponds to the first remote network device.

The home network bridge then uses 46 uses the previously established network tunnel connection to forward a version of the message to the first remote network device using a translated destination address comprising the particular private network address as is assigned within the destination privately addressed network to the target network device. In a preferred approach, the home network bridge also uses the source address which comprises the local private network address for the source network device. Use of the actual private network address for the target network device permits the opposing home network bridge, upon receipt of this message, to properly direct the message to this particular target network device.

When the received message 44 comprises a message as was received via the network tunnel connection and as was sourced by a given device of the opposing privately addressed network, the home network bridge again makes use 47 of the map. In this case, however, the home network bridge uses the map to correlate a particular private network address as is assigned within the opposing privately addressed network for the given device with a specific one of the locally available private network addresses as is now assigned via the mapping process within the local privately addressed network. For example, and referring again to the illustrative example portrayed in FIG. 5, when the particular private network address comprises remote address 1, the home network bridge identifies local address 4 as corresponding thereto.

The home network bridge then modifies 48 the received message by substituting the specific one of the locally available private network private addresses for a source address as comprised a part of the received message. Routing of the modified message is then facilitated 49 by forwarding the modified message to the local target network device while also portraying the source as comprising a local network device having a local private address.

So configured, the various network devices of a plurality of distinct and unrelated private networks can communicate with one another as though they were all part of a single shared private network. Such communications require no specific alteration of the network devices themselves as they can essentially continue to communicate in their ordinary and regular manner. In effect, by configuring and adapting the home network bridges to serve as a proxy for devices of an opposing privately addressed network and as a router to effect local routing of externally sourced messages, the devices of both privately addressed networks are privately addressable within the context and administration of their own home network.

Such home network bridges require no service or protocol support from their respective residential gateways beyond that which is standard and already available with such network elements. Consequently these teachings are readily applicable with legacy infrastructure that is already in place in numerous homes. Those skilled in the art will also understand and appreciate that such home network bridges will require little or no user administration to establish and maintain remote communications of the type described herein. For the interested reader, co-pending application XXX as was referred to earlier provides teachings with respect to the use of so-called UPnP techniques as a specific way to facilitate communications between and via the residential gateway.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method to facilitate communications between devices of two discrete privately addressed networks, wherein each of the two discrete privately addressed networks are coupled via a publicly addressed network and have a corresponding gateway that operably couples to the publicly addressed network, the method comprising:

providing a privately addressed first home network bridge in a first one of the two discrete privately addressed networks, wherein the privately addressed first home network bridge couples to a first gateway as corresponds to the first one of the two discrete privately addressed networks, the first gateway being interposed between the privately addressed first home network bridge and the publicly addressed network;

providing a second privately addressed home network bridge in a second one of the two discrete privately addressed networks, wherein the second privately addressed home network bridge couples to a second gateway as corresponds to the second one of the two discrete privately addressed networks, the second gateway being interposed between the second privately addressed home network bridge and the publicly addressed network;

establishing a network tunnel connection between the first privately addressed home network bridge and the second privately addressed home network bridge via the first gateway, the publicly addressed network, and the second gateway;

causing at least the first privately addressed home network bridge to serve as a proxy, via the second privately addressed home network bridge, for devices of the second discrete privately addressed network and as a router to route communications sourced by the devices of the second discrete privately addressed network to devices of the first discrete privately addressed network, wherein said causing further comprises:

receiving from the second privately addressed home network bridge via the network tunnel connection, at the first privately addressed home network bridge, private network addresses as are assigned within the second discrete privately addressed network for devices of the second discrete privately addressed network; and within the first privately addressed home network bridge, mapping each of the private network addresses as are assigned within the second discrete privately addressed network to a locally available private network address within the first discrete privately addressed network.

2. The method of claim 1 wherein establishing a network tunnel connection between the first privately addressed home network bridge and the second privately addressed home network bridge via the first gateway, the publicly addressed network, and the second gateway further comprises:

the first privately addressed home network bridge determining a public network address as corresponds to the second one of the two discrete privately addressed networks.

3. The method of claim 2 wherein establishing a network tunnel connection between the first privately addressed home network bridge and the second privately addressed home network bridge via the first gateway, the publicly addressed network, and the second gateway further comprises:

using the public network address as corresponds to the second one of the two discrete privately addressed networks to forward a network tunnel client-initiated message to the second privately addressed home network bridge.

4. The method of claim 3 wherein establishing a network tunnel connection between the first privately addressed home network bridge and the second privately addressed home network bridge via the first gateway, the publicly addressed network, and the second gateway further comprises:

the second privately addressed home network bridge responding to the network tunnel Client-initiated message with a network tunnel server-initiated message.

5. The method of claim 1 wherein causing at least the first privately addressed home network bridge to serve as a proxy, via the second privately addressed home network bridge, for devices of the second discrete privately addressed network and as a router to route communications sourced by the devices of the second discrete privately addressed network to devices of the first discrete privately addressed network further comprises:

at the first privately addressed home network bridge, responding to network entity inquiries from the devices on the first discrete privately addressed network with the locally available private network addresses, such that the devices of the second discrete privately addressed network appear to the devices of the first discrete privately addressed network as being privately addressable within the first discrete privately addressed network.

6. The method of claim 5 wherein causing at least the first privately addressed home network bridge to serve as a proxy, via the second privately addressed home network bridge, for devices of the second discrete privately addressed network and as a router to route communications sourced by the devices of the second discrete privately addressed network to devices of the first discrete privately addressed network further comprises:

at the first privately addressed home network bridge, receiving from one of the devices on the first discrete privately addressed network a message that comprises, in part:

a destination address comprising a first one of the locally available private network addresses;

a source address comprising a local private first network address for the device.

7. method of claim 6 wherein causing at least the first privately addressed home network bridge to serve as a proxy, via the second privately addressed home network bridge, for devices of the second discrete privately addressed network and as a router to route communications sourced by the devices of the second discrete privately addressed network to devices of the first discrete privately addressed network further comprises:

at the first privately addressed home network bridge, using the mapping to correlate the first one of the locally available private network addresses with a particular private network address as is assigned within the second discrete privately addressed network.

8. The method of claim 7 wherein causing at least the first privately addressed home network bridge to serve as a proxy, via the second privately addressed home network bridge, for devices of the second discrete privately addressed network and as a router to route communications sourced by the devices of the second discrete privately addressed network to devices of the first discrete privately addressed network further comprises:

at the first privately addressed home network bridge, using the network tunnel connection to forward a version of the message to the second privately addressed home network bridge using:

a translated destination address comprising the particular private network address as is assigned within the second discrete privately addressed network; and the source address comprising the local private first network address for the device.

9. The method of claim 8 wherein causing at least the first privately addressed home network bridge to serve as a proxy, via the second privately addressed home network bridge, for devices of the second discrete privately addressed network and as a router to route communications sourced by the devices of the second discrete privately addressed network to devices of the first discrete privately addressed network further comprises:

at the second privately addressed home network bridge:

receiving the version of the message via the network tunnel connection;

using a map that correlates each of the private network addresses as are assigned within the first discrete privately addressed network to a locally available private network address within the second discrete privately addressed network, translating the source address to a particular corresponding locally available second network private address;

modifying the version of the message by substituting the source address for the particular corresponding locally available second network private address to provide a modified message;

forwarding the modified message to a device as corresponds to the particular private network address;

such that it will appear to the device as corresponds to the particular private network address that the modified message was sourced by a local device within the second discrete privately addressed network.

10. A method for use by a first privately addressed home network bridge in a first privately addressed network to facilitate communications between devices of the first privately addressed network with devices of a second privately addressed network, wherein the first and second privately addressed home networks each has a corresponding gateway that operably couples to a publicly addressed network, the method comprising:

establishing a network tunnel connection with a second privately addressed home network bridge as comprises a part of a second privately addressed network via the gateways and the publicly addressed network, such that the gateway of the first privately addressed home network is interposed between the first privately addressed home network bridge and the publicly addressed network, and the gateway of the second privately addressed home network is interposed between the second privately addressed home network bridge and the publicly addressed network;

serving, via the network tunnel connection, as a proxy for devices of the second privately addressed network to devices of the first privately addressed network and as a router to facilitate routing communications sourced by the devices of the second privately addressed network to devices of the first privately addressed network, wherein said serving further comprises:

receiving from the second privately addressed home network bridge via the network tunnel connection, at the first privately addressed home network bridge, private network addresses as are assigned within the second discrete privately addressed network for devices of the second discrete privately addressed network; and within the first privately addressed home network bridge, mapping each of the private network addresses as are assigned within the second discrete privately addressed network to a locally available private network address within the first discrete privately addressed network.

11. The method of claim 10 wherein establishing a network tunnel connection with a second privately addressed home network bridge as comprises a part of a second privately addressed network via the gateways and the publicly addressed network further comprises:

determining a public network address as corresponds to the second privately addressed network;

using the public network address as corresponds to the second privately addressed network to forward a network tunnel client-initiated message to the second privately addressed home network bridge.

12. The method of claim 10 wherein serving, via the network tunnel connection, as a proxy for devices of the second privately addressed network to devices of the first privately addressed network and as a router to facilitate routing communications sourced by the devices of the second privately addressed network to devices of the first privately addressed network further comprises:

sending to the second privately addressed home network bridge via the network tunnel connection private network addresses as are assigned within the first privately addressed network for devices of the first privately addressed network.

13. The method of claim 12 wherein serving, via the network tunnel connection, as a proxy for devices of the second privately addressed network to devices of the first privately addressed network and as a router to facilitate routing communications sourced by the devices of the second privately addressed network to devices of the first privately addressed network further comprises:

receiving from one of the devices on the first privately addressed network a message that comprises, in part:
a destination address comprising a first one of the locally available private network addresses;
a source address comprising a local private first network address for the device.

14. The method of claim 13 wherein serving, via the network tunnel connection, as a proxy for devices of the second privately addressed network to devices of the first privately addressed network and as a router to facilitate routing communications sourced by the devices of the second privately addressed network to devices of the first privately addressed network further comprises:

using the mapping to correlate the first one of the locally available private network addresses with a particular private network address as is assigned within the second privately addressed network;

using the network tunnel connection to forward a version of the message to the second addressed home network bridge using:
a translated destination address comprising the particular private network address as is assigned within the second privately addressed network; and
the source address comprising the local private first network address for the device.

15. The method of claim 14 wherein serving, via the network tunnel connection, as a proxy for devices of the second privately addressed network to devices of the first privately addressed network and as a router to facilitate routing communications sourced by the devices of the second privately addressed network to devices of the first privately addressed network further comprises:

receiving a message via the network tunnel connection as was sourced by a given device of the second privately addressed network;

using the mapping to correlate a particular private network address as is assigned within the second privately addressed network for the given device with a specific one of the locally available private network addresses as is assigned within the first privately addressed network;

modifying the message by substituting the specific one of the locally available private network private addresses for a source address as comprised a part of the message to provide a modified message;

facilitating routing of the modified message to a device of the first privately addressed network.

16. The method of claim 10 wherein establishing a network tunnel connection further comprises establishing a secure network tunnel connection.

17. A privately addressed home network bridge for use in a first privately addressed network to facilitate communications between devices of the first privately addressed network with devices of a second privately addressed network, wherein the first and second privately addressed networks each has a corresponding gateway that operably couples to a publicly addressed network, comprising:

means for establishing a network tunnel connection with a second privately addressed home network bridge as comprises a part of the second privately addressed network via the gateways and the publicly addressed network, such that the gateway of the first privately addressed home network is interposed between the first privately addressed home network bridge and the publicly addressed network, and the gateway of the second privately addressed home network is interposed between the second privately addressed home network bridge and the publicly addressed network;

means for serving, via the network tunnel connection, as a proxy for devices of the second privately addressed network to devices of the first privately addressed network and as a router to facilitate routing communications sourced by the devices of the second privately addressed network to devices of the first privately addressed network, wherein said means for serving further comprises:

means for receiving from the second privately addressed home network bridge via the network tunnel connection, at the first privately addressed home network bridge, private network addresses as are assigned within the second discrete privately addressed network for devices of the second discrete privately addressed network; and within the first privately addressed home network bridge, means for mapping each of the private network addresses as are assigned within the second discrete privately addressed network to a locally available private network address within the first discrete privately addressed network.

18. The privately addressed home network bridge of claim 17 wherein the privately addressed home network bridge comprises a stand-alone platform.

19. The privately addressed home network bridge of claim 17 wherein the privately addressed home network bridge is integrated with another element within the first privately addressed network.

20. The privately addressed home network bridge of claim 17 wherein the means for serving, via the network tunnel connection, as a proxy for devices of the second privately addressed network to devices of the first privately addressed network and as a router to facilitate routing communications sourced by the devices of the second privately addressed network to devices of the first privately addressed network further comprises:

means for receiving from one of the devices on the first privately addressed network a message that comprises, in part:

a destination address comprising a first one of the locally available private network addresses;

a source address comprising a local private first network address for the device;

means for using the map to correlate the first one of the locally available private network addresses with a particular private network address as is assigned within the second privately addressed network;

means for using the network tunnel connection to forward a version of the message to the second addressed home network bridge using:

a translated destination address comprising the particular private network address as is assigned within the second privately addressed network; and the source address comprising the local private first network address for the device.

21. The privately addressed home network bridge of claim 17 wherein the means for serving, via the network tunnel connection, as a proxy for devices of the second privately addressed network to devices of the first privately addressed network and as a router to facilitate routing communications sourced by the devices of the second privately addressed network to devices of the first privately addressed network further comprises:

means for receiving a message via the network tunnel connection as was sourced by a given device of the second privately addressed network;

means for using the map to correlate a particular private network address as is assigned within the second privately addressed network for the given device with a specific one of the locally available private network addresses as is assigned within the first privately addressed network;

means for modifying the message by substituting the specific one of the locally available private network private addresses for a source address as comprised a part of the message to provide a modified message;

means for facilitating routing of the modified message to a device of the first privately addressed network.

* * * * *